(12) United States Patent
Quakernack et al.

(10) Patent No.: US 11,080,061 B2
(45) Date of Patent: Aug. 3, 2021

(54) PRE-LOADING OF INSTRUCTIONS

(71) Applicant: WAGO Verwaltungsgesellschaft mbH, Minden (DE)

(72) Inventors: Frank Quakernack, Bielefeld (DE); Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 38 days.

(21) Appl. No.: 16/694,514

(22) Filed: Nov. 25, 2019

(65) Prior Publication Data
US 2020/0089501 A1 Mar. 19, 2020

Related U.S. Application Data

(63) Continuation of application No. PCT/EP2018/062932, filed on May 17, 2018.

(30) Foreign Application Priority Data

May 24, 2017 (DE) ...................... 10 2017 208 838.9

(51) Int. Cl.
| | |
|---|---|
| *G06F 9/38* | (2018.01) |
| *G06F 9/445* | (2018.01) |
| *H04L 12/40* | (2006.01) |
| *H04L 12/42* | (2006.01) |
| *G06F 9/54* | (2006.01) |

(Continued)

(52) U.S. Cl.
CPC ............ *G06F 9/3802* (2013.01); *G06F 9/445* (2013.01); *G06F 9/546* (2013.01); *H04L 12/403* (2013.01); *H04L 12/40013* (2013.01); *H04L 12/40019* (2013.01); *H04L 12/42* (2013.01);
(Continued)

(58) Field of Classification Search
CPC ............... H04L 12/42; H04L 12/40013; H04L 2012/4026; G06F 9/3802; G06F 9/445
See application file for complete search history.

(56) References Cited

U.S. PATENT DOCUMENTS

| | | |
|---|---|---|
| 5,472,347 A | 12/1995 | Nordenstrom et al. |
| 7,912,085 B1 * | 3/2011 | Orthner .................. H04L 69/08 370/466 |

(Continued)

FOREIGN PATENT DOCUMENTS

| | | |
|---|---|---|
| DE | 10 2010 020 446 A1 | 11/2011 |
| EP | 3 157 201 A1 | 4/2017 |
| WO | WO 2006/069691 A1 | 7/2006 |

*Primary Examiner* — Rasheed Gidado
(74) *Attorney, Agent, or Firm* — Muncy, Geissler, Olds & Lowe, P.C.

(57) ABSTRACT

A method and a data bus subscriber are described for processing process data in a local bus, in particular a ring bus, the method including receiving a first symbol during a first number of working cycles, with the first symbol comprising first process data; loading at least one first instruction from an instruction list during the first number of working cycles, receiving a second symbol during a second number of working cycles, with the second symbol comprising second process data, processing the first process data contained in the first symbol with the at least one loaded first instruction during the second number of working cycles, and loading at least one second instruction for processing the second process data of the second symbol during the second number of working cycles.

19 Claims, 3 Drawing Sheets

(51) Int. Cl.
  *H04L 12/403*  (2006.01)
  *H04L 12/423*  (2006.01)

(52) U.S. Cl.
  CPC .......... *H04L 12/422* (2013.01); *H04L 12/423* (2013.01); *H04L 2012/4026* (2013.01)

(56) References Cited

U.S. PATENT DOCUMENTS

| | | |
|---|---|---|
| 8,144,718 B2 | 3/2012 | Schwenkel et al. |
| 8,285,884 B1 * | 10/2012 | Norrie ................. G06F 13/4278 710/14 |
| 8,554,978 B2 | 10/2013 | Buesching et al. |
| 8,750,365 B1 * | 6/2014 | Sarca ...................... H04L 5/006 375/232 |
| 9,875,108 B2 * | 1/2018 | Pokam .................. G06F 9/3834 |
| 10,243,880 B2 | 3/2019 | Poledna |
| 10,503,506 B2 * | 12/2019 | Batley .................. G06F 9/3824 |
| 10,983,947 B2 * | 4/2021 | Mykland ............... G06F 9/3897 |
| 2004/0168044 A1 | 8/2004 | Ramchandran |
| 2008/0002737 A1 * | 1/2008 | Schwenkel ........ G05B 19/4185 370/463 |
| 2008/0148020 A1 * | 6/2008 | Luick .................... G06F 9/3853 712/213 |
| 2011/0080967 A1 * | 4/2011 | Larsson .............. H04L 27/2607 375/260 |
| 2017/0090922 A1 * | 3/2017 | Tu ....................... G06F 9/30101 |
| 2017/0111293 A1 * | 4/2017 | Poledna ................ H04L 47/826 |

\* cited by examiner

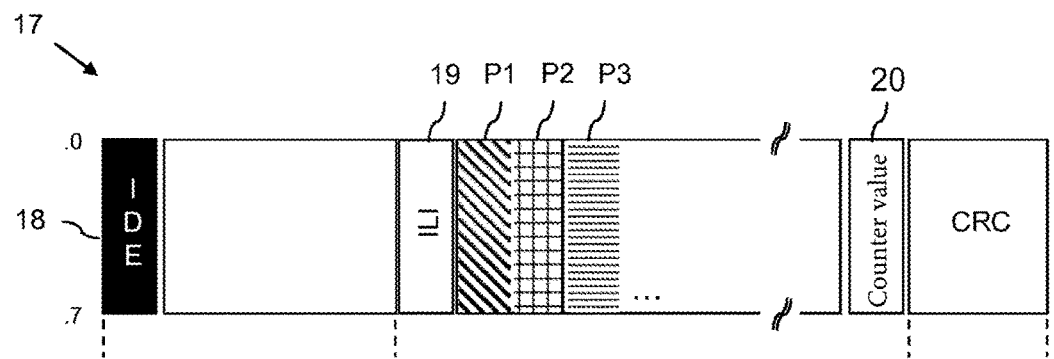
FIG. 2
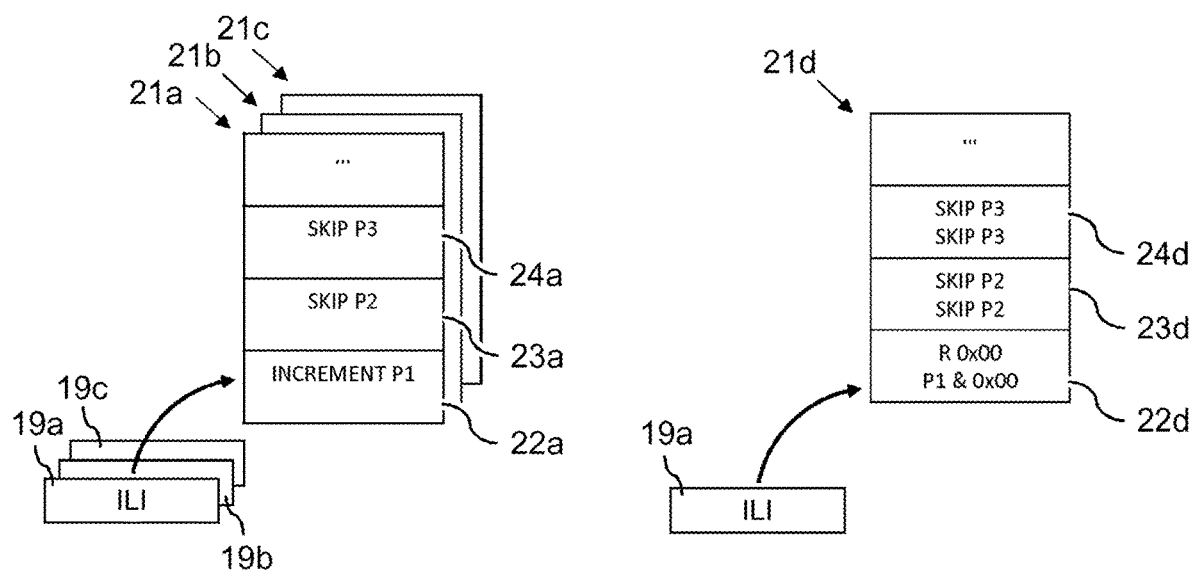
FIG. 3a  FIG. 3b

PRE-LOADING OF INSTRUCTIONS

This nonprovisional application is a continuation of International Application No. PCT/EP2018/062932, which was filed on May 17, 2018, and which claims priority to German Patent Application No. 10 2017 208 838.9, which was filed in Germany on May 24, 2017, and which are both herein incorporated by reference.

BACKGROUND OF THE INVENTION

Field of the Invention

The present invention relates to a data bus subscriber of an automation system and the preloading of instructions and specifically the preloading of instructions for processing of process data by data bus subscribers of a local bus.

Description of the Background Art

Data bus subscribers and process data are typically used in the context of automation systems, but are not limited to such applications.

Automation systems are used in particular for controlling industrial plants, buildings and means of transport. Usually, a plurality of sensors and actuators are required in order to control an automation system. These sensors and actuators monitor and control the process that the system carries out. These different sensors and actuators of an automation system are often referred to as automation devices.

These automation devices may either be connected directly to a controller of the automation system, or may first be connected to input and output modules, often referred to as I/O modules. These may in turn be connected directly to the controller. These automation devices may either be integrated directly into the I/O modules or may be connected to them via a wired or wireless connection.

The control of an automation system is usually accomplished using one or more programmable logic controllers (PLCs). The PLCs may be arranged hierarchically or decentrally in an automation system. There are different performance classes for the PLCs, so that they may be subject to different controls and rules depending on the computing and memory capacity.

In the simplest case, a PLC has inputs, outputs, an operating system (firmware) and an interface via which a user program may be loaded. The user program determines how the outputs are switched as a function of the inputs. The inputs and outputs may be connected to the automation devices and/or the I/O modules, and the logic stored in the user program may be used to monitor or control the process that the automation system performs. The sensors provide monitoring of the process and the actuators provide control of the process. The controller may also be referred to as a central controller or central unit and controls at least one automation device or I/O module connected to the controller.

However, directly connecting the automation devices with at least one controller or the I/O modules with at least one controller in the form of parallel wiring, i.e. running a line from each automation device or each I/O module to the higher-level controller, is very time-consuming. Especially with the increasing degree of automation of an automation system, the cabling effort increases in the case of parallel wiring. This involves a great deal of effort in project planning, installation, commissioning and maintenance.

For this reason, bus systems, particularly fieldbus systems, are presently typically used in automation technology that allows connecting the automation devices or the I/O modules to the controller. Such subscribers of a bus system are also referred to as bus subscribers. Because data is exchanged on the bus system, the bus subscribers are often also called data bus subscribers. In order to further simplify the connection of the individual automation devices or I/O modules with the bus system, currently, individual groups of automation devices or I/O modules are often first connected to each other to form a local bus system using a specialized local bus, and then at least one subscriber of this local bus is connected to the bus system that is connected to the controller. In this case, the local bus system may differ from the bus system that is used to establish the connection with the control system.

In a group of local bus subscribers, the subscriber that is connected to the bus system of the controller is often referred to as a local bus master.

Alternatively, the term "head-end station" of the local bus system is also used. In contrast to other local bus subscribers, this local bus master may contain additional logic units, circuits or functionalities that are necessary for connecting to the bus system of the controller. The local bus master itself may also contain a PLC. This subscriber may also have logic units and circuits for converting between the two bus systems. The local bus master accordingly may also be designed as a gateway or bus converter, and ensures that the data available in the format of one bus system is converted into the format of the local bus system and vice versa. Usually, but not necessarily, the local bus master is specialized for connecting the local bus to the higher-level bus.

The local buses that are used are usually adapted to the special usage requirements of the automation devices or local-bus-specific I/O modules, or take into account the specific hardware design thereof. In this case, the groups of automation devices or I/O modules of the local bus system usually form a subgroup of the automation system for executing a specific task in the process that the automation system carries out. The data exchanged on the local buses for the process is often referred to as local bus data or process data, because this data contains information for regulating or controlling the process that the automation system carries out. This data may comprise, among other things, measurement data, control data, status data and/or other information. Depending on the bus protocol used, this data may be prepended ("header") or appended ("tail") to other data. This other data may contain information regarding the data, or information regarding internal communication on the local bus. In this case, a multiplicity of different information is known that may be prepended or appended to the data depending on the bus protocol used.

A ring bus is a specialized form of a local bus, as is known for example from U.S. Pat. No. 5,472,347 A. In a ring bus, the data bus subscribers, for example the automation devices or I/O modules, are each respectively connected to their directly adjacent data bus subscribers, and data is forwarded in sequence from one data bus subscriber to another. The data transmitted on the local bus may also be referred to as local bus data.

Thus, the data is not sent to all data bus subscribers simultaneously, but in sequence, with a data bus subscriber receiving data from its upstream data bus subscriber and forwarding data to its downstream data bus subscriber. Between receiving the data and forwarding it, the data bus subscriber may process the received data. When the data has reached the last data bus subscriber in the sequence, the data from the last data bus subscriber is returned back to the first data bus subscriber. The return may take place via all data bus subscribers or by bypassing them via a bypass line. The ring bus thus has a downstream flow and an upstream flow of data. The data in a ring bus is usually transmitted in the form of data packets that pass through all data bus subscribers.

In a ring bus, the data packet is passed from one data bus subscriber to the other. At any given time, a data bus subscriber receives only part of the data packet from its upstream data bus subscriber. When the data bus subscriber has processed the data contained in this part, the part is forwarded to the downstream data bus subscriber and at the same time a new part of the data packet is received from the upstream data bus subscriber. In this way, all parts of the data packet pass sequentially through all data bus subscribers.

In the prior art, the processing time of the data, i.e. the time between the data bus subscribers detecting the process data and having a processing result, depends on their respective computing speed. The processing delays that arise in a ring bus accordingly depend on the respective computing speeds of the data bus subscribers.

SUMMARY OF THE INVENTION

It is therefore an object of the present invention to provide a method and a data bus subscriber for improved processing of process data.

This task is accomplished by means of a method and a data bus subscriber according to the independent claims. Advantageous embodiments are described in the dependent claims.

A method is described for processing process data in a data bus subscriber in a local bus, in particular a ring bus. In this case, a data bus subscriber is used to control or monitor a process, in particular by outputting control signals, for example to actuators, and/or by receiving measurement signals, for example from sensors. The data bus subscriber converts the control signals and/or measurement signals into process data for the local bus, or vice versa. The data bus subscribers may also be referred to as local bus subscribers. The data bus subscribers receive the process data or send them on in the form of symbols.

Accordingly, the method according to the invention comprises, first, the step of receiving a first symbol during a first number of working cycles. For example, the symbol may be formed of bits, in particular a fixed number of bits, for example 8 bits. If these bits are received serially via the local bus, a certain number of bits, for example exactly one bit of the symbol, may for example be received with each working cycle. The first number of working cycles for receiving the complete first symbol may then, for example, depend on the number of bits the first symbol has. For example, 10 working cycles may be required to receive 8 bits, because the 8 bits, for example, are encoded using 10 bits. During the first number of working cycles, i.e. the reception of the first symbol, the method according to the invention involves the step of loading at least one first instruction from an instruction list. Loading the at least one first instruction may for example comprise reading the at least one first instruction from a memory. The memory may be a memory that is arranged in the data bus subscriber, i.e. is part of the data bus subscriber, or a memory that the data bus subscriber is able to access. The memory may be a volatile or non-volatile memory. In the memory, the instruction may be stored in an instruction list. An instruction list comprises a set of instructions for processing data. Accordingly, an instruction list defines a behavior of the data bus subscriber with regard to the data to be processed in one or more symbols, for example with regard to the process data to be processed. The instruction list will then contain at least one instruction, preferably exactly one instruction for each symbol received. If no data is processed for a symbol, the instruction list will have a null operation "NOP" ("No OPeration") or "SKIP" operation, which are equivalent, as the instruction.

The method according to the invention additionally comprises the step of receiving a second symbol during a second number of working cycles, the second symbol comprising second process data. During reception of the second symbol, the first process data is processed with the at least one loaded instruction, and at least one second instruction is loaded during the receiving of the second symbol that contains the second process data. The processing of the first process data during the second number of working cycles may take place, for example, within the first half of the number of working cycles, in particular parallel to loading the second instruction. Loading the at least one second instruction may, for example, involve reading the at least one second instruction from a memory. The memory may be a memory that is arranged in the data bus subscriber, i.e. is part of the data bus subscriber, or a memory that the data bus subscriber is able to access. The memory may be a volatile or non-volatile memory.

Thus, instructions that are necessary for the processing of process data in a symbol are already loaded during the receiving of the symbol before actual processing, in order to ensure a fast and above all deterministic processing of the process data.

The described advance loading of instructions may be repeated for all symbols that will be received and processed. Advance loading means that instructions are already loaded at a time before the received symbols that will be processed with these instructions, and accordingly the received process data that will be processed, are completely available. The number of symbols to be processed depends on the data exchanged on the local bus. Data is usually stored in a local bus by means of data packets, which may contain a number of symbols. The data packets may also be referred to as data telegrams. For example, a data packet has a header, a payload, and advantageously, a checksum. A data packet is advantageously a communication data packet or a process data packet. A communication data packet does not contain any process data. Advantageously, a communication data packet contains data in particular for programming and/or for controlling and/or for monitoring and/or for identifying at least one data bus subscriber.

A process data packet comprises process data that are sent and/or received by the data bus subscribers of the local bus. The process data is used to control an automation process.

As a result of loading the instructions for processing the process data contained in the symbols of the data packets, the working cycles available to a data bus subscriber may be optimally used and a data bus subscriber may perform processing within the available working cycles without having to increase the computing speed.

In a preferred embodiment of the method according to the invention, the first number of working cycles corresponds to the number of working cycles required to receive the first symbol. For example, the symbol may be formed of a number of bits and a certain number of bits may be received serially from the local bus per working cycle. The symbol may, for example, formed of 8 bits, so that, for example, 8 working cycles are required for serial reception of the 8 bits if only one bit is received per working cycle. For example, the 8-bit data of a symbol may also be encoded with 10 bits, and accordingly 10 bits may be transmitted per symbol. However, the skilled person will understand that a symbol may have different numbers of bits and that the number of bits received per working cycle depends on the implementation of the local bus. The method may also comprise a serial to parallel conversion of the received symbols.

For example, the symbol may be received serially and bit-by-bit, and each bit received may be written into a register. As soon as the register has collected enough bits of the symbol, the symbol may be processed in parallel. After processing, the processed symbol may be re-written into the register or another register and re-output serially to the local bus. However, the skilled person will also be familiar with other possibilities for serial to parallel conversion. The method may also involve encoding and decoding the symbols.

Another preferred embodiment of the method according to the invention additionally comprises loading process data from a memory during the first number of working cycles; the processing of the first process data contained in the first symbol comprises changing the process data contained in the first symbol based on the process data loaded from the memory.

The memory may be a memory that is arranged in the data bus subscriber, i.e. part of the data bus subscriber, or it may be a memory that the data bus subscriber is able to access. The memory may be a volatile or non-volatile memory. Processing may be the logical combination of the process data loaded from the memory with the first process data contained in the first symbol. These logical combinations may be arbitrary and may be based, for example, on a reduced set, such as "AND", "OR", "NOT", "NOR", "XOR", "NAND", "SHIFT", "SKIP", "INCREMENT", "NEGATION", and the like, or a combination thereof. The processing of the process data may be for example bit-granular, i.e. one or more bits may be processed independently of each other. The skilled person will understand that although only the first process data is mentioned here, this may also refer to all other process data, because these data may be the first process data for the mentioned step.

In an exemplary embodiment of the method according to the invention, processing involves writing the process data contained in the first symbol to a memory. The memory may be a memory that is arranged in the data bus subscriber, i.e. part of the data bus subscriber, or it may be a memory that the data bus subscriber is able to access. The memory may be a volatile or non-volatile memory. The processing of the process data may be for example bit-granular, i.e. one or more bits may be processed independently of each other. The skilled person will understand that although only the first process data is mentioned here, this may also refer to all other process data, because these data may be the first process data for the mentioned step. Writing to the memory may depend on whether a validity signal is present, i.e. on whether the validity of the received data has been checked.

Thus, processing may comprise reading process data from a memory or writing process data to a memory. The memory the data is read from may be the same as the memory the data is written to. It is also conceivable that in a first step, first process data are written into the memory, and are read again while receiving a symbol that follows directly or indirectly, and are combined with second process data from this subsequent symbol.

When the process data contained in the first symbol is processed, it need not necessarily be changed. Nevertheless, the time of receiving the second symbol may be used so that the data bus subscriber may perform a different processing based on the at least one preloaded instruction. This processing may, for example, formed of combining process data inside the memory. This may be used, for example, to carry out preprocessing. In this case, the working cycles of the data bus subscriber may be used for a corresponding processing of process data that is already present in the memory. It is also conceivable that during this time, the data bus subscriber may dump process data within the memory. The skilled person will understand that the working cycles of the data bus subscriber during which no processing of the received symbol takes place may also be used in other ways. This other processing may likewise be predetermined by the instruction preloaded in the first symbol.

The loading of the first and second instructions can be triggered by a respective validity signal associated with receiving the respectively preceding symbol. Thus, the respective instructions are only loaded if the symbol has been correctly received and a corresponding validity signal has been generated and output. Processing may also be carried out within a fixed number of working cycles, in particular within two working cycles, after the validity signal is output.

A symbol that in particular precedes the first symbol may have an instruction list index (ILI). This instruction list index is used to select an instruction list for processing the process data in the subsequent symbols. The instruction list index informs the data bus subscriber regarding which stored instruction list to use.

An instruction list index is thus mapped to an instruction list or vice versa, so that the instruction list index may be used to identify the instruction list to use. For this purpose, the instruction list index preferably has a value that is associated with an instruction list; for example, the value indicates a specific instruction list or its location in memory. For this purpose, the value itself may be the memory address where the instruction list is stored in the data bus subscriber or where at least one first instruction of the instruction list is stored. Alternatively or additionally, the value may also refer to a memory area in which the corresponding instruction list is stored. The term "direct mapping" may also be used in the cases mentioned above. The value of the instruction list index may also be used, for example, as an entry in a lookup table (LUT). The value of the instruction list index is the input value of the lookup table. The output value of the lookup table may be the memory address of the first instruction in the associated instruction list or may otherwise identify the instruction list. The instruction list index may preferably have a value from a fixed value range. For example, the instruction list index may come from the bit value range between 0000 and 1111. However, it will be clear to a skilled person that other value ranges may also be used. The lookup table may be stored as software or as hardware, in the form of for example logic circuits, and may indicate a bijective mapping from an input value to an output value, with the output value providing an indication of the instruction list to be used. How a relationship is established between the instruction list index and the instruction list is a function of the lookup table. The use of a lookup table may also be referred to as "indirect mapping." In the case of direct and indirect mapping, however, the instruction list for the data bus subscriber to use is bijectively identifiable, i.e. locatable, via the instruction list index. The data bus subscriber then executes the instruction list located via the instruction list index, in order to process the process data in the subsequent symbols. The instruction list may contain a set of instructions, for example, one instruction for each symbol to be received. The instruction list may contain instructions in a sequence that corresponds to the sequence of the symbols that will be received.

Loading of the instructions may include loading two 32-bit instructions and combining the two 32-bit instructions into a 64-bit instruction. In this case, the two 32-bit instructions may follow directly after one another. The available instructions in this case may for example be "SKIP", "MOVE", "NEGATION", "AND", "OR" and "INCREMENT" or a combination thereof.

The symbols can be received in a particular sequence, wherein the first symbol is received immediately before the second symbol and the second symbol is received immediately before a third symbol, and so forth. In this case, the sequence of the symbols may correspond to the sequence of the instructions in the instruction list. Accordingly, the first plurality of working cycles may be followed by the second plurality of working cycles, and so forth, with the plurality of working cycles not overlapping with one another.

The aforementioned task is also accomplished by a data bus subscriber of a local bus, in particular a ring bus, according to the invention. The data bus subscriber has at least one receiver for receiving symbols via the local bus. In this case, the receiver may be, for example, a receiver circuit or a transceiver circuit. The circuits may be implemented for example in an application-specific integrated circuit (ASIC) or in a field programmable gate array (FPGA). The receiver may be an 8b/10b converter that converts the serially received 10-bit data into parallel 8-bit data, or may have a different serial to parallel converter. The receiver may be adapted to receive each symbol in a respectively predetermined number of working cycles. The receiver may receive a respective symbol in a certain number of working cycles, and the symbol may contain process data to be processed.

The data bus subscriber according to the invention also comprises a loader for loading instructions that may for example be loaded from a volatile or non-volatile memory. This memory may be part of the data bus subscriber or the data bus subscriber may access the memory.

In this case, at least one symbol, or the process data in the symbol, may be processed using at least one loaded instruction. It is also conceivable, however, that at least one instruction will cause process data already stored on the data bus subscriber to be processed.

The data bus subscriber according to the invention also comprises at least one processor for processing process data from the received symbols based on loaded instructions, with the instruction loader being adapted so as to load at least one instruction for processing the process data of a symbol in a number of working cycles while the symbol that will be processed using the instruction is being received. In another words, at the same time that a symbol is being received, the instruction with which the symbol or the process data contained in the symbol will be processed is also being loaded. The present symbol is processed at the same time that a subsequent symbol is being received. The processor may be a microcontroller or a computing circuit, which may be formed in particular by gate elements of an integrated circuit. The computing circuit may be designed as a digital logic circuit that in particular is designed as at least a part of a semiconductor chip. The circuits may be implemented in an ASIC or an FPGA.

The receiver can be adapted to generate a validity signal and the loader is adapted to load the instructions before receiving the validity signal. In this case, the validity signal may for example indicate that all expected data has been received. For example, in an 8b/10b encoding in which 8 bits of data are encoded using 10 bits, the validity signal may be generated if all 10 bits have been received or if the conversion from 10 bits to 8 bits was successful.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a schematic representation of a data packet formed of symbols, wherein some symbols carry process data;

FIGS. 3a and 3b are schematic representations of instruction lists with instructions for processing the process data shown in FIG. 2.

DETAILED DESCRIPTION

Figure 1:
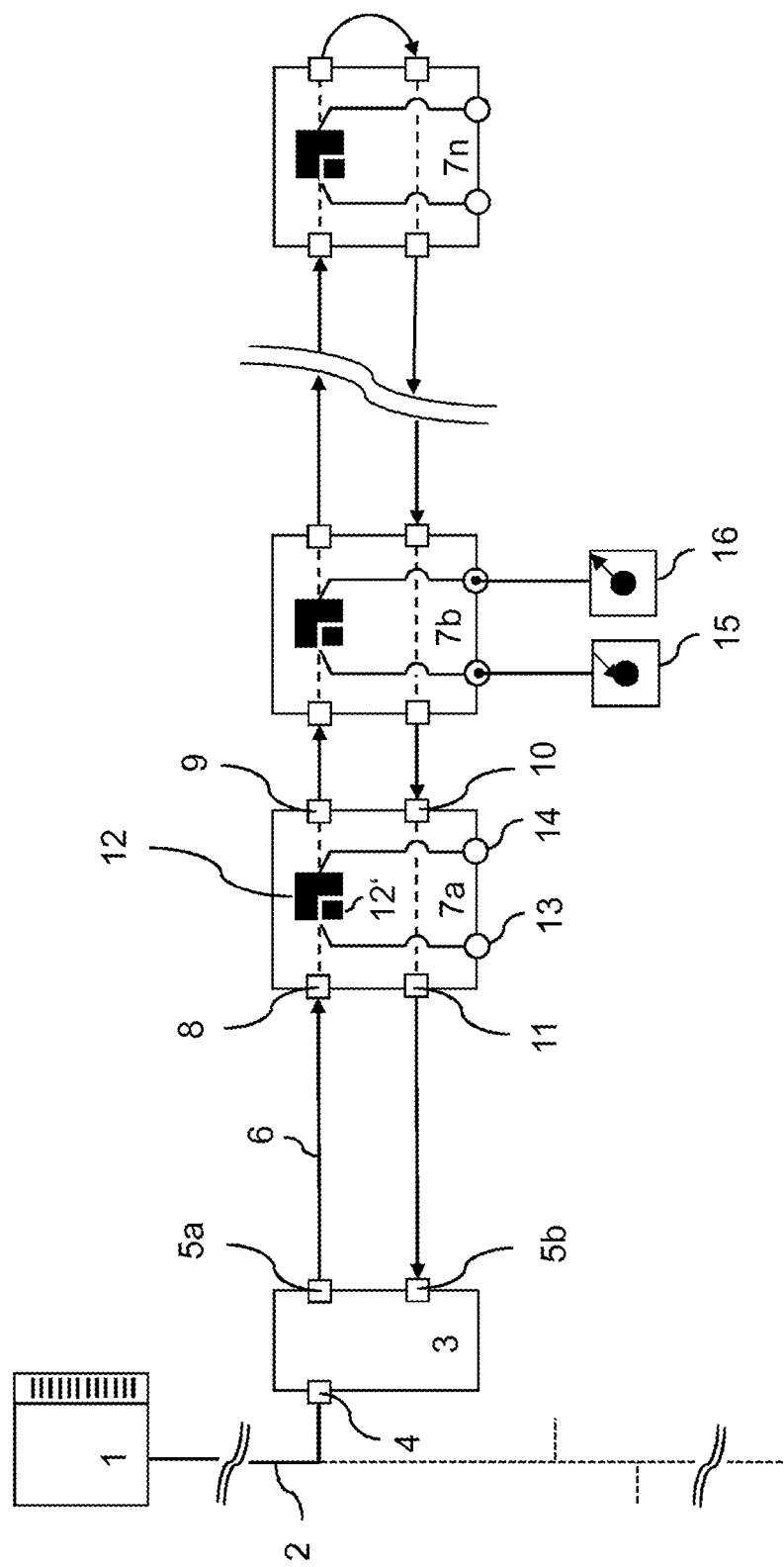
FIG. 1 is a schematic block diagram of an exemplary automation system with a programmable logic controller and an exemplary ring bus.

FIG. 1 shows a schematic block diagram of an automation system. The skilled person will understand that the automation system shown is only exemplary, and that all elements, modules, components, subscribers and units belonging to the automation system may be designed differently but may still fulfil the basic functionalities described herein.

The automation system shown in FIG. 1 has a higher-level controller 1, which may be implemented, for example, using a programmable logic controller (PLC). A PLC 1 of this type is basically used to control and regulate the process that the automation system carries out. Currently, however, PLCs 1 used in automation systems also perform more extensive functions, such as for example visualization, alarming and recording all data relating to the process; as such, the PLC 1 functions as a human-machine interface. There are PLCs 1 in different performance classes that have different resources (computing capacity, memory capacity, number and type of inputs and outputs, and interfaces) that enable the PLC 1 to control and regulate the process of the automation system. A PLC 1 usually has a modular structure and formed of individual components, each respective one of which fulfils a different task.

A PLC 1 usually formed of a central computer assembly (with one or more main processors and memory modules) and a plurality of assemblies with inputs and outputs. Such modularly-structured PLCs 1 may readily be extended by adding assemblies. In this case, which assemblies must be integrated into the PLC 1 will depend on the complexity of the process and the complexity of the structure of the automation system. In contemporary automation systems, the PLC 1 is usually no longer an independent system;

instead, the PLC 1 is connected to an internet or intranet via corresponding interfaces. As a result, the PLC 1 is part of a network via or from which the PLC 1 may receive information, instructions, programming and the like. For example, the PLC 1 may receive information about materials supplied to the process via a connection to a computer located in an intranet or internet, so that, for example, the process may be optimally controlled by knowing the number or nature thereof. It is also conceivable that a user may control the PLC 1 by accessing it from an intranet or internet. For example, a user may use a computer, also known as a host computer, to access the PLC 1 and check, change or correct the PLC's user programming. Accordingly, the PLC 1 may be accessed from one or more remote maintenance or control stations. The host computers may have visualization devices for representing process workflows.

To control the process of the automation system, the PLC 1 is connected to automation devices. Bus systems are used for these connections to minimize wiring effort. In the exemplary embodiment shown in FIG. 1, the PLC 1 is connected to a local bus master 3 of a lower-level local bus system via a higher-level bus 2, which in the exemplary embodiment shown here may be a fieldbus. However, not only a local bus master 3 of a local bus as in the exemplary embodiment shown here, but also any other subscribers that are designed to communicate with the PLC 1, may be connected to the higher-level bus 2.

In the exemplary embodiment shown here, the higher-level bus 2 is connected to the local bus master 3. To this end, the local bus master 3 has a first interface 4 that is designed in such a way that it may be connected to the higher-level bus 2. For this purpose, the interface 4 may, for example, have a receptacle in the form of a socket, and the higher-level bus 2 may have a plug that the socket may accommodate. For example, the plug and socket may be a modular plug and modular socket, with each core of the higher-level bus 2 being electrically or optically connected to a connection in the modular socket. However, the skilled person will also be familiar with other options for designing an interface 4 so that the local bus master 3 may be electrically or optically connected to the higher-level bus 2. The skilled person will be familiar with screw, bearing, click or plug connections that may be used to establish an electrical or optical connection. A male plug is usually accommodated by a female counterpart. This accommodation usually not only establishes the electrical or optical connection, but also ensures that the two parts are mechanically coupled and may only be separated from each other by applying a certain force. However, it is also possible that the higher-level bus 2 may be permanently wired to the interface 4.

The local bus master 3 in the exemplary embodiment shown here has an additional second interface to connect the local bus master 3 to the local bus. Data bus subscribers 7a, 7b, . . . , 7n are connected to or form the local bus. The local bus is advantageously designed in such a way that a data packet sent by the local bus master 3 is transmitted back to the local bus master 3 by all the data bus subscribers 7a, 7b, . . . , 7n connected to the local bus. In this case, a data bus subscriber 7a, 7b, . . . , 7n always receives only a part of the data packet the data bus subscriber 7a, 7b, . . . , 7n upstream of it. After a time period in which the data bus subscriber 7a, 7b, . . . , 7n may process the data contained in this part, it forwards the part to the downstream data bus subscriber 7a, 7b, . . . , 7n, and at the same time receives a new part of the data packet from the upstream data bus subscriber 7a, 7b, . . . , 7n. In this way, all parts of the data packet pass sequentially through all the data bus subscribers 7a, 7b, . . . , 7n. The local bus is advantageously designed with a ring-shaped structure. Such local buses may also be referred to as ring buses 6.

The local bus may alternatively be designed to be stranded or star-shaped, or to have a combination or mixture of the above designs. In this case, the data packets are sent and received via the second interface of the local bus master 3. In the exemplary embodiment shown here, the second interface is divided into a first part 5a and a second part 5b. The first part 5a of the second interface establishes the downstream connection in the ring bus 6 and the second part 5b of the second interface establishes the upstream connection in the ring bus 6. In the exemplary embodiment shown here, the ring bus 6, the data transmission direction of which is shown with arrows in the exemplary embodiment of FIG. 1, has data bus subscribers 7a, 7b, . . . , 7n. In the exemplary embodiment shown here, these data bus subscribers 7a, 7b, . . . , 7n each have a respective interface 8 in order to receive data from an upstream or preceding data bus subscriber 7a, 7b, . . . , 7n. The data bus subscriber 7a receives data from the upstream local bus master 3 via the interface 8. The data on the local bus 6 may also be referred to as local bus data. In addition, in the exemplary embodiment shown here, the data bus subscribers 7a, 7b, . . . , 7n each respectively have an interface 9 in order to forward data to a downstream or subsequent data bus subscriber 7a, 7b, . . . , 7n. Data bus subscriber 7a sends data to the downstream data bus subscriber 7b via the interface 9. The interfaces 8 and 9 are used to propagate data in the downstream direction of the ring bus 6, i.e. away from the local bus master 3. Moreover, in this exemplary embodiment the data bus subscribers 7a, 7b, . . . , 7n also have interfaces 10 and 11 for propagating data in the upstream direction of the ring bus 6, i.e. toward the local bus master 3. In the case of the data bus subscriber 7a, the interface 10 is designed to receive data from the downstream or subsequent data bus subscriber 7b, and the interface 11 is designed to forward data to the upstream or preceding data bus subscriber, in this case the local bus master 3. Thus, it may also be the that the interfaces 9 and 11 are transmitter interfaces, while the interfaces 8 and 10 are receiver interfaces.

In the exemplary embodiment shown here, the connections of the interfaces and the PLC 1 or the data bus subscribers 7a, 7b, . . . , 7n are implemented with the aid of cables or printed circuit boards and/or by direct or indirect contacting using electrical contacts. Another alternative is that the individual connections are established wirelessly and the interfaces provide the necessary conversions for the radio standards used.

Although in the exemplary embodiment shown here, the local bus master 3 and the individual data bus subscribers 7a, 7b, . . . , 7n are shown spaced apart from each other, i.e. the local bus master 3 is arranged decentrally from the data bus subscribers 7a, 7b, . . . , 7n, the skilled person will understand that the data bus subscribers 7a, 7b, . . . , 7n and the local bus master 3—which also represents a data bus subscriber of the ring bus 6—may also be directly connected together. In this case, for example, contacts of one data bus subscriber may access corresponding receptacles or receiving contacts of a directly adjacent data bus subscriber in order to establish an electrical connection between the data bus subscribers so that data may be sent in the downstream and upstream directions. For example, the data bus subscribers 7a, 7b, . . . , 7n may have receptacles on the side facing away from the master and contacts on the side facing toward the master. If the data bus subscribers 7a, 7b, . . . , 7n are then connected in sequence accordingly, the contacts of the one data bus subscriber 7a, 7b, . . . , 7n each engage in the respective receptacles of the other data bus subscriber 7a, 7b, . . . , 7n and an electrical connection may be established. The local bus master 3 in this case correspondingly has contacts on the side that engage with the receptacles of the first data bus subscriber 7a in order to establish an electrical connection between the interfaces 5a and 8 or the interfaces 5b and 11. However, the skilled person will also be familiar with other possibilities for establishing an electrical or optical connection between two data bus subscribers 7a, 7b, . . . , 7n arranged directly next to each other, for example pressure contacts and knife and fork contacts.

If it is desired that data bus subscribers 7a, 7b, . . . , 7n and the local bus master 3 are directly connected together, they may also have mechanical mountings or mechanical fasteners using which the individual data bus subscribers 7a, 7b, . . . , 7n and the local bus master 3 may be connected to each other.

For example, a data bus subscriber 7a, 7b, . . . , 7n may have a projection on one side and an undercut on the other. If the data bus subscribers 7a, 7b, . . . , 7n are then connected in sequence, a projection engages in an undercut of the other data bus subscriber 7a, 7b, . . . , 7n, so that a mechanical coupling occurs. For straightforwardly sequentially arranging the data bus subscribers 7a, 7b, . . . , 7n, they may also be arranged on a shared mounting, for example a top-hat rail. The data bus subscribers 7a, 7b, . . . , 7n may have appropriate fasteners for fastening onto the top-hat rail. Alternatively or additionally, the data bus subscribers 7a, 7b, . . . , 7n may also, for example, have detachably connectable fasteners with which the data bus subscribers 7a, 7b, . . . , 7n may be fastened either to the top-hat rail or to another mounting. For this purpose, the detachably connectable fasteners may be replaceable and a corresponding fastener for the desired mounting may be connected to the data bus subscribers 7a, 7b, . . . , 7n so that these may be fastened to the desired mounting.

In addition, the data bus subscribers 7a, 7b, . . . , 7n in the exemplary embodiment shown in FIG. 1 also have a processing unit 12, which for example include a processing component and a logic unit, which are shown in greater detail in FIG. 3. The processing unit 12 may also be described as the complete circuit of the data bus subscriber. In other words, the processing unit 12 receives data via the inputs 8 and 10 and transmits data via the outputs 9 and 11. In addition, the processing unit 12 may receive or output data via the input/outputs 13 and 14. Moreover, the processing unit 12 has access to a memory 12' of the data bus subscriber 7a, 7b, . . . , 7n in which, for example, data, process data or instruction lists are stored.

The processing unit 12 may also be described as the complete circuit of the data bus subscriber. In other words, the processing device 12 receives data via the inputs 8 and 10 and transmits data via the outputs 9 and 11. In addition, the processing device 12 may receive or output data from the inputs/outputs 13 and 14. Moreover, the processing unit 12 has access to a memory 12' of the data bus subscriber 7a, 7b, . . . , 7n in which, for example, data, process data or instruction lists are stored.

The processing unit 12 may be designed to process received data and to output data. Data for processing may be received either from an upstream data bus subscriber or from inputs 13 of the data bus subscriber 7a, 7b, . . . , 7n. The inputs 13 of the data bus subscriber 7a, 7b, . . . , 7n may in this case be connected to sensors 15 that for example send measurement data, status data, and the like. Processed data may be output either to a downstream data bus subscriber or to outputs 14 of the data bus subscriber 7a, 7b, . . . , 7n. The outputs 14 of the data bus subscriber 7a, 7b, . . . , 7n may be connected to actuators 16, that for example carry out a certain action using the data directed to them. If data processing also takes place in the upstream direction, data may also be received from a downstream data bus subscriber 7a, 7b, . . . , 7n and processed data may be sent to an upstream data bus subscriber 7a, 7b, . . . , 7n.

For the sake of simplicity, the data bus subscribers 7a, 7b, . . . , 7n are only shown with one input 13 and one output 14 in the exemplary embodiment shown here, and only data bus subscriber 7b is connected to a sensor 15 and actuator 16. However, the skilled person will understand that the data bus subscribers 7a, 7b, . . . , 7n may have a multiplicity of inputs and outputs 13 and 14, and may be connected to a multiplicity of different sensors 15 and actuators 16. The characteristic feature of the sensors 15 is that the sensors 15 receive data or signals and send them to the data bus subscribers 7a, 7b, . . . , 7n, while the actuators 16 receive data or signals from the data bus subscribers 7a, 7b, . . . , 7n and perform an action based on these data or signals.

Alternatively, the interfaces 8, 9, 10 and 11 may be integrated in a module unit and the data bus subscribers 7a, 7b, . . . , 7n may be plugged into this module unit. The module units may also be described as basic elements of the ring bus 6. The ring bus infrastructure is set up by the module units and the data bus subscribers 7a, 7b, . . . , 7n are replaceable, so that the ring bus 6 may be set up with any arbitrary data bus subscribers 7a, 7b, . . . , 7n.

The module units also serve to ensure that communication between the remaining data bus subscribers 7a, 7b, . . . , 7n is not interrupted even if a data bus subscriber 7a, 7b, . . . , 7n is removed, because communication takes place via the remaining module units.

The data bus subscribers 7a, 7b, . . . , 7n shown in this exemplary embodiment are often referred to as I/O modules, due to their inputs and outputs 13, 14, which may be connected to sensors 15 or actuators 16. Although the data bus subscribers 7a, 7b, . . . , 7n are shown as spatially separated from the sensors 15 or actuators 16 in the exemplary embodiment shown here, the sensors 15 or actuators 16 may also be integrated into the I/O module.

The ring bus 6 shown in this exemplary embodiment is based on cycle frame communication. For example, a cycle frame may be defined as a recurring (cyclic), preferably equidistant, time interval in which data may be transferred on the ring bus 6. For example, the cycle frame has at least a start identifier (SOC) and a time range for transmitting data. A plurality of start identifiers (SOC) of successive cycle frames are advantageously offset equidistantly in time. The aforementioned time range is intended for transmitting the data packets that may be transmitted in the form of data packets within the cycle frame. The start identifier (SOC) and data packets are transmitted via the ring bus 6 and pass through all data bus subscribers 7a, 7b, . . . , 7n. Advantageously, the cycle frame is initiated by the local bus master 3 in the ring bus 6. The start identifier (SOC) is separate, i.e. may be transferred as an independent symbol or may be advantageously contained in a start data packet (SOC packet).

Zero, one or more data packets are transferred within the time range of the cycle frame. Advantageously, idle data is inserted in a cycle frame, in particular adjoining at least one data packet. Advantageously the transmission of the data packets and/or the idle data causes an uninterrupted signal on the ring bus 6. The signal enables the data bus subscribers 7a, 7b, ..., 7n to temporally synchronize themselves to the signal.

Advantageously, the cycle frame additionally comprises a trailer. The trailer has a variable length and follows the time range for data transmission, preferably up to the next start identifier (SOC) of the next cycle frame. Advantageously, the trailer has idle data.

Each data packet is sent in a downstream direction from the local bus master 3 to the first data bus subscriber 7a of the ring bus 6. This subscriber receives a first part of the data packet via the interface 8. Such a part of the data packet is referred to below as a piece, unit, or symbol. The data bus subscriber 7a then processes the part and forwards the part to the next data bus subscriber 7b via the interface 9, and preferably at the same time, the first data bus subscriber 7a receives a second part of the data packet and so on. The size of the parts of the data packet, i.e. the chunking of the data packet, depends on the receiving capacity of the data bus subscribers 7a, 7b, ..., 7n; for example, a fixed number of bits, for example 8 bits of the data packet, may be simultaneously available for processing at the data bus subscriber 7a, 7b, ..., 7n. If the data transmission on the local bus 6 is serial, the interfaces 8 and 10 may be adapted to carry out a serial to parallel conversion and the interfaces 9 and 11 may be adapted to carry out a parallel to serial conversion. For this purpose, the interfaces 8, 9, 10, 11 may have corresponding registers. The interfaces 8, 9, 10, 11 may also be adapted to carry out codings and encodings that may potentially be necessary. For example, an 8b/10b encoding may be used on the local bus, and may be converted via the interfaces 8, 9, 10 and 11.

The data packet passes through the data bus subscribers 7a, 7b, ..., 7n in units, chunks or parts, for example in parts or symbols of 8 bits. That part of the data packet that the last data bus subscriber has processed (in the exemplary embodiment shown here, data bus subscriber 7n), then passes through the ring bus 6 in the upstream direction, so that the parts starting from the last data bus subscriber 7n are again sent upstream in the direction of local bus master 3 by all data bus subscribers 7a, 7b, ..., 7n. For this purpose, either the last data bus subscriber 7n has a switchable bridge that connects the interface 9 with the interface 10, or a switchable bridge is connected to the last data bus subscriber 7n, which assumes the function of forwarding the parts of the data packet from the interface 9 to the interface 10.

Alternatively, the interface 10 of the data bus subscriber 7n may also be connected directly to the interface 5b of the local bus master 3 using a bypass line.

In the upstream direction, the units of the data packet or data packets may be looped back to the local bus master 3 by the individual data bus subscribers 7a, 7b, ..., 7n, as in the exemplary embodiment shown here, without further processing. However, it is also conceivable that in the upstream direction the units of the data packet are processed again, so that the data packet may be processed twice, once in the downstream direction to the last data bus subscriber 7n and once in the upstream direction to the local bus master 3. For example, processing may take place in the upstream direction by signal refreshing and/or phase shifting.

When processing the data packets in the downstream direction, i.e. away from the local bus master 3, or in the upstream direction, i.e. toward the local bus master 3, the processing is performed using instruction lists, and the instruction lists contain sets of instructions that the processing unit 12 of the data bus subscribers 7a, 7b, ..., 7n may execute. The instruction lists themselves may be sent to the individual data bus subscribers 7a, 7b, ..., 7n an initialization phase by the local bus master 3 or may advantageously be sent to the data bus subscribers 7a, 7b, ..., 7n during the ongoing communication, so that the data bus subscribers 7a, 7b, ..., 7n are programmed without interrupting the communication.

An instruction list index may be used to communicate to the data bus subscribers 7a, 7b, ..., 7n which of the instruction lists the data bus subscribers 7a, 7b, ..., 7n should use. This instruction list index informs the data bus subscriber which stored instruction list it should use. An instruction list index is thus mapped to an instruction list or vice versa, so that the instruction list index may be used to identify the instruction list to use.

For this purpose, the instruction list index preferably has a value that is associated with an instruction list; for example, the value indicates a specific instruction list or its location in memory. For this purpose, the value itself may be the memory address where the instruction list is stored, or where at least one first instruction of the instruction list is stored. Alternatively or additionally, the value may also refer to a memory area in which the corresponding instruction list is stored. The term "direct mapping" may also be used in the cases mentioned above. The value of the instruction list index may also be used, for example, as an entry in a lookup table (LUT). The value of the instruction list index is the input value of the lookup table. The output value of the lookup table may be the memory address of the first instruction in the associated instruction list or may otherwise identify the instruction list. The lookup table may be stored as software or as hardware, in the form of for example logic circuits, and may indicate a bijective mapping from an input value to an output value, with the output value providing an indication of the instruction list to be used. How a relationship is established between the instruction list index and the instruction list is a function of the lookup table. The use of a lookup table may also be referred to as "indirect mapping."

In the case of direct and indirect mapping, however, the instruction list for the data bus subscriber to use is bijectively identifiable, i.e. locatable, via the instruction list index. The instruction list index may be inserted into the data packet before the local bus data that will be processed, so that the data bus subscribers 7a, 7b, ..., 7n may use the corresponding instruction list that corresponds to the sequence of local bus data in the data packet. In this case, the instruction lists contain instructions that are adapted to the sequence of the local bus data in the data packet. For example, the instruction lists may contain a "SKIP" instruction for local bus data that is not directed to the data bus subscriber 7a, 7b, ..., 7n, i.e. they may instruct the data bus subscriber 7a, 7b, ..., 7n to skip the corresponding part of the data packet, while in contrast the instruction list for local bus data directed to the data bus subscriber 7a, 7b, ..., 7n may comprise corresponding instructions for processing the local bus data.

Figure 4:
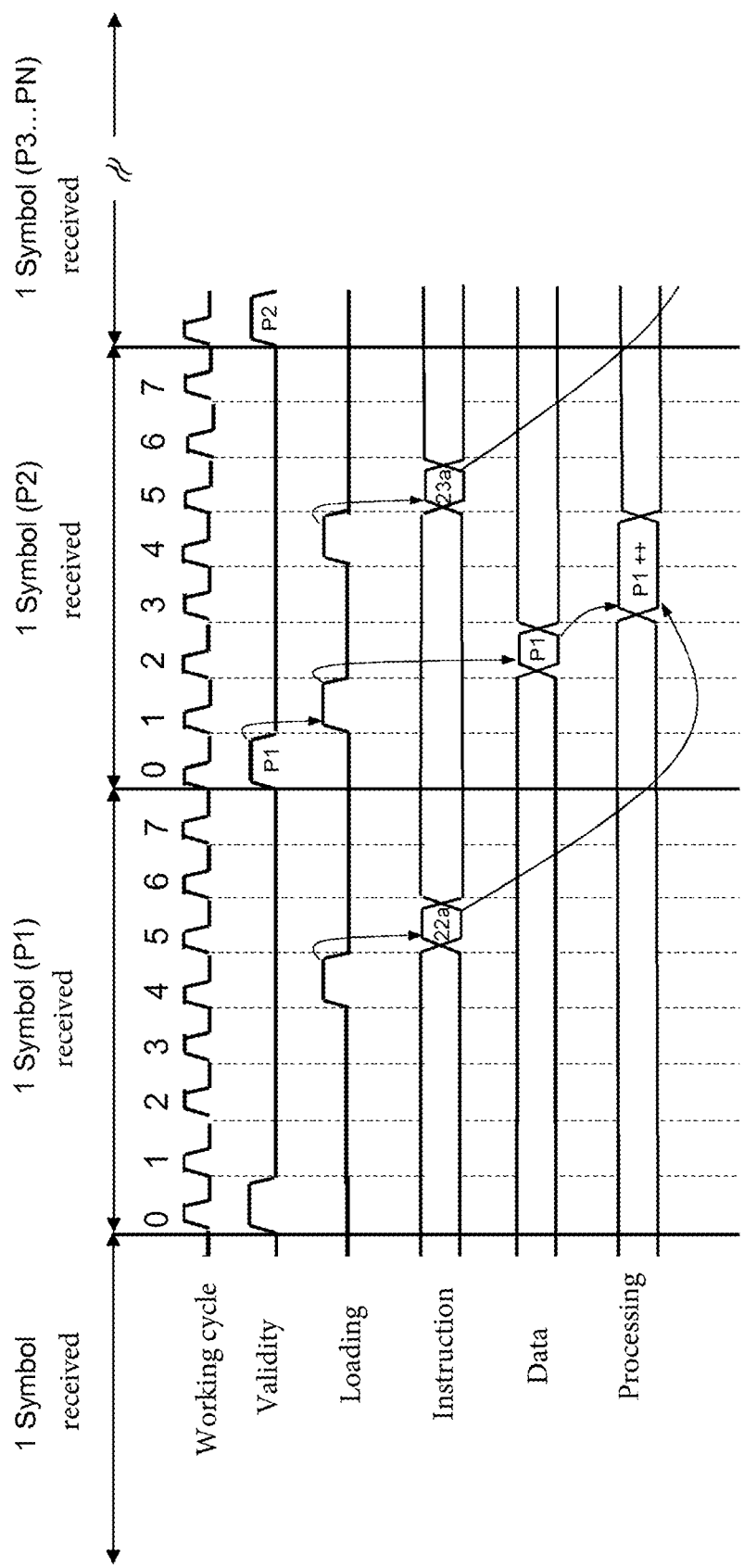
FIG. 4 is an exemplary time diagram that shows the preloading of instructions for processing the process data shown in FIG. 2.

The processing of the local bus data may thus be decoupled from the actual position of the local bus data in the data packet, because the instruction lists serve to adapt the data bus subscribers to the sequence of the local bus data in the data packet. FIGS. 3 and 4 show the processing of local bus data by the processing unit 12.

First, however, FIG. 2 schematically shows a data packet 17 that a local bus master 3 uses, with local bus data P1, P2, P3. The local bus data P1, P2, P3 may for example be process data. The illustrated data packet 17 formed of a general header part, an information part and a checksum part.

The header contains a field 18 that contains a unique bit pattern IDE that occurs only once, which may also be referred to as a codeword or packet identifier. The number and configuration of unique bit patterns or code words depend on the coding used on the ring bus 6. Alternatively or additionally, special bit patterns or codewords may be defined in the bus protocol used. It is only of importance that the data bus subscribers 7a, 7b, . . . , 7n may bijectively determine, from the bit pattern or codeword of the field 18, which type of data packet 17 is involved. The codeword of the field 18 is for example forwarded directly via a bypass connection. In the exemplary embodiment shown here, the data bus subscribers 7a, 7b, . . . , 7n know that if a field 18 is received with a bit pattern IDE, it is a data packet 17 that carries process data P1, P2, P3.

The header may also contain additional information for example whether the data packet 17 is moving in a downstream or upstream direction. For example, the last data bus subscriber 7n may write information in the header indicating that the data packet 17 has already passed this data bus subscriber 7n and has been sent back to the local bus master 3. Moreover, the header may also contain information about the length of the data packet 17, so that the data bus subscribers 7a, 7b, . . . , 7n may check the integrity of the data packet 17 or may ascertain how many parts of the data packet 17 remain to be received by the data bus subscriber 7a, 7b, . . . , 7n before a new data packet 17 begins.

However, the skilled person will also be familiar with other fields that may be written into a header of a data packet 17, which the data bus subscribers 7a, 7b, . . . , 7n may use for control or error detection.

The information part of data packet 17 may begin with an instruction list index field 19, ILI, which specifies which instruction list the data bus subscribers 7a, 7b, . . . , 7n should use. For example, in normal operation of ring bus 6, it may be provided that all data bus subscribers 7a, 7b, . . . , 7n may use their first instruction list, but in the event of an error, the second instruction list should be used. The instruction list index may refer directly to the memory location of the instruction list stored in the data bus subscriber 7a, 7b, . . . , 7n, or the instruction list index may have a value that the data bus subscriber 7a, 7b, . . . , 7n may use to locate the corresponding instruction list, for example via a lookup table. The information part also comprises the actual process data P1, P2 and P3. In the exemplary embodiment shown here, these process data P1, P2, P3 are shown with different patterns.

In the exemplary embodiment shown here, the data packet 17 is divided into symbols of respectively 8 bits each. The data bus subscribers 7a, 7b, . . . , 7n also receive and process the data packet 17 chunked in this fashion. In other words, first the local bus master 3 sends the symbol or field IDE 18 to the first data bus subscriber 7a, and after a pre-determined time, the local bus master 3 sends another symbol of the header of the data packet 17 to the data bus subscriber 7a, which in turn at the same time sends the symbol or field IDE 18 to the data bus subscriber 7b. This predetermined time between sending and receiving the symbols of the data packet may also be referred to as the clocking of the local bus, i.e. the bus clock. Sending and receiving may take place at each clock cycle or may require a plurality of clock cycles.

Additionally, the data packet 17 in the information part has a field 20 that may be configured as a counter and may be incremented or decremented by each data bus subscriber 7a, 7b, . . . , 7n through which this part of the data packet 17 has already been routed.

The local bus master 3 may use the counter value of the field 20 to check whether the data packet 17 has passed through all data bus subscribers 7a, 7b, . . . , 7n.

The data packet 17 shown in FIG. 2 has a bijectively-identified bit pattern 18 and ends with a checksum. However, the skilled person will understand that a cycle frame may contain a plurality of data packets that are organizationally contained within a cycle frame. Data packets themselves may be bijectively identified by a prepended bit pattern.

In the exemplary embodiment shown here, the data bus subscribers 7a, 7b, . . . , 7n are devised so as to determine that if a data packet with the bit pattern IDE 18 is received, this data packet carries process data P1, P2, P3, PN. The processing of local bus data is shown in greater detail in FIGS. 3 and 4, using the process data P1, P2, P3 as an example.

FIG. 3 shows a schematic representation of instruction lists 21a, 21b, 21c, 21d with different instructions. In this case, each instruction list 21a, 21b, 21c, 21d is associated with a unique instruction list index 19a, 19b, 19c and vice versa.

FIG. 3a, for example, shows that the instruction list index 19a refers to the instruction list 21a, which contains instructions 22a, 23a and 24a. The instruction list index 19a may, for example, refer to the first instruction 22a of the instruction list 21a in the memory 12' of the data bus subscriber 7a. In the other data bus subscribers 7b, 7n the instruction list index 19a may also refer to a respective instruction list, but this list may be different in each data bus subscriber 7a, 7b, . . . , 7n, i.e. it may have different instructions 22, 23 and 24.

FIG. 3b shows, by way of example, that the instruction list index 19a refers to the instruction list 21d, which has instructions 22d, 23d and 24d, which however differ from the instructions shown in FIG. 3a. For example, the instruction list index 19a may refer to the first instruction 22d of instruction list 21d in the memory of the data bus subscriber 7b. In the example shown in FIG. 3b, each entry in the instruction list 21d contains two entries, not one, so two instructions are executed for each symbol.

The skilled person will understand that the instruction lists 21a, 21b, 21c, 21d shown in FIGS. 3a and 3b are shown only by way of example and that they may be configured in arbitrarily different ways.

FIG. 4 shows an exemplary time diagram of the preloading of the instructions 22a and 23a shown in FIG. 3a, for processing the process data of the data packet 17 shown in FIG. 2.

FIG. 4 shows, by way of example, that the instruction 22a is loaded at the same time that a first symbol carrying the process data P1 is being received. Thus, at this moment the data bus subscriber, for example the data bus subscriber 7a, already knows which instruction list should be used, namely the instruction list 21a, as shown in FIG. 3b. The instruction list index 19a, which was transmitted before the process data P1, has notified the data bus subscriber 7a that it should use this instruction list. In the exemplary embodiment shown here, the loading of the instruction 22a may include reading the memory 12' of the corresponding data bus subscriber 7a. In the exemplary embodiment shown here, the instruction 22a has the processing step of incrementing the process data P1, as shown in FIG. 3a. The processing of the corresponding process data P1 is then executed in the subsequent symbol. In the subsequent symbol, the process data P2 are received. If the validity of the process data P1 previously received in the symbol is determined with working cycle 0, the received process data P1 is loaded in working cycle 1;

the loading in this case may be the loading of the process data P1 into a register or buffer, so that the process data P1 is available in working cycle 2 and starting from working cycle 3, it may be processed according to the preloaded instruction 22a, i.e. it may for example be incremented. During processing, the next instruction 23a of the instruction list 21a is already preloaded, and the process data P2 are then processed with this instruction.

Thus, by preloading an instruction while a symbol is being received, an optimal time utilization may be ensured, and it may be ensured that the data bus subscribers 7a, 7b, . . . , 7n will be able to carry out the appropriate processing in the working cycles available to them, without any need to adjust the computing speed.

Even when the above description refers to "data" in the plural, the skilled person will understand that this also encompasses data in the singular, i.e. a single datum.

The components of the device according to the invention that have been described as separate units, modules or interfaces in the described exemplary embodiment may be implemented as separate hardware, but preferably they are integrated onto the same semiconductor chip. Preferably, their function is implemented in hardware using logic gates. For example, the units, modules, or interfaces may be implemented on an FPGA/ASIC.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing data at a data bus subscriber in a local bus the method comprising:
   receiving a first symbol during a first number of working cycles, wherein the first symbol comprises first process data;
   loading at least a first instruction from an instruction list during the first number of working cycles;
   receiving a second symbol during a second number of working cycles, wherein the second symbol comprises second process data;
   processing the first process data contained in the first symbol with the at least one loaded first instruction during the second number of working cycles; and
   loading at least one second instruction for processing the second process data from the second symbol during the second number of working cycles,
   wherein the first number of working cycles and the second number of working cycles do not overlap.

2. The method according to claim 1, wherein the first number of working cycles corresponds to the number of working cycles for receiving the first symbol.

3. The method according to claim 2, wherein the first symbol is received serially and converted into parallel.

4. The method according to claim 1, additionally comprising:
   loading process data from a memory during the first number of working cycles, and wherein processing the first process data contained in the first symbol comprises changing the first process data contained in the first symbol based on the process data loaded from the memory.

5. The method according to claim 1, wherein processing the first process data contained in the first symbol comprises writing the first process data contained in the first symbol into a memory.

6. The method according to claim 1, wherein the processing of the first process data is performed parallel to loading the second instruction during the second number of working cycles.

7. The method according to claim 1, wherein loading the at least one first instruction and the at least one second instruction is triggered by a respective validity signal generated by the data bus subscriber upon checking the respective preceding symbol for validity.

8. The method according to claim 7, where the processing is carried out within a fixed number of working cycles after output of the validity signal.

9. The method according to claim 1, wherein the processing of the first process data takes place in a bit-granular fashion.

10. The method according to claim 1, wherein loading the at least one first instruction and the at least one second instruction comprises reading the at least one first instruction and the at least one second instruction from a memory of the data bus subscriber, and
    wherein the first symbol with the first process data and the second symbol with the second process data are received via a bus interface of the data bus subscriber.

11. The method according to claim 1, additionally comprising: receiving another symbol before the first symbol, wherein the another symbol has an instruction list index that is associated with a specific instruction list.

12. The method according to claim 1, wherein the first and second symbols are received in a certain sequence at a processor, and wherein the first symbol is received immediately before the second symbol and the second symbol is received immediately before a third symbol, the first instruction being loaded while the first symbol is being received, the second instruction being loaded at the processor while the second symbol is being received at the processor and while the first instruction and the first symbol are being processed at the processor.

13. The method according to claim 1, wherein loading the at least the first instruction includes loading two 32-bit instructions and combining the two 32-bit instructions into a 64-bit instruction.

14. The method according to claim 1, wherein the first instruction for processing the first symbol is loaded before the first process data is validated.

15. The method according to claim 1, wherein the local bus is a ring bus network and wherein the first symbol and the second symbol are received from another data bus subscriber on the local bus.

16. The method according to claim 1, wherein the first instruction and the second instruction are loaded from the instruction list which is stored in a memory on a processor that processes the first symbol and the second symbol, the first instruction being loaded based on a first list index, the second instruction being loaded based on a second list index, the first list index and the second list index being received over the local bus.

17. A data bus subscriber of a local bus, comprising:
    a bus receiver to receive symbols via the local bus, the bus receiver receives the symbols in a respectively predetermined number of working cycles;
    an instruction loader that accesses processing instructions from a memory; and
    a processor to process a process data from the received symbols based on the instructions loaded from the memory of the processor,
    wherein the loader is adapted to load to the processor at least one instruction for processing first process data of a first symbol during a first number of working cycles in which the first symbol to be processed with the instruction is received, and wherein the processor is adapted to process the first process data received in the first symbol using the loaded at least one instruction within a second number of working cycles in which a second symbol is received, wherein the first number of working cycles and the second number of working cycles do not overlap in time.

18. The data bus subscriber according to claim 17, wherein the processor receives the first symbol and the second symbol in a certain sequence, wherein the first symbol is received immediately before the second symbol and the second symbol is received immediately before a third symbol via a serial transmission on the local bus, the at least one instruction being loaded while the first symbol is being received, and wherein another instruction is loaded at the processor while the second symbol is being received at the processor and while the at least one instruction and the first symbol are being processed at the processor.

19. The data bus subscriber according to claim 17, wherein the at least one instruction for processing the first symbol is loaded before the first process data is validated by the bus receiver.

* * * * *